United States Patent
Sakai et al.

(10) Patent No.: US 8,572,828 B2
(45) Date of Patent: Nov. 5, 2013

(54) COMPONENT MOUNTING STRUCTURES

(75) Inventors: Toshihiro Sakai, Nagoya (JP); Akihisa Hotta, Ichinomiya (JP); Koji Katano, Toyota (JP); Toshiyuki Inagaki, Toyota (JP); Nobutaka Teshima, Tokai (JP)

(73) Assignees: Aisan Kogyo Kabushiki Kaisha, Obu-shi, Aichi-ken (JP); Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 996 days.

(21) Appl. No.: 12/209,435

(22) Filed: Sep. 12, 2008

(65) Prior Publication Data

US 2009/0070981 A1 Mar. 19, 2009

(30) Foreign Application Priority Data

Sep. 14, 2007 (JP) .................................. 2007-239074

(51) Int. Cl.
*B21D 39/03* (2006.01)

(52) U.S. Cl.
USPC .................. 29/284; 29/434; 29/592; 29/166; 29/428; 403/220; 428/591; 428/544; 428/101; 269/289 R; 269/302.1; 269/900; 269/291; 269/21

(58) Field of Classification Search
USPC ....... 269/289 R, 302.1, 900, 291, 21; 29/435, 29/592, 166, 284; 428/591, 544, 101; 403/220

See application file for complete search history.

(56) References Cited

U.S. PATENT DOCUMENTS

| | | | | |
|---|---|---|---|---|
| 3,129,920 A | * | 4/1964 | Stillwagon | 251/148 |
| 3,301,581 A | * | 1/1967 | Winberg | 403/379.4 |
| 6,129,188 A | * | 10/2000 | Friedmann et al. | 192/3.58 |
| 7,101,083 B2 | * | 9/2006 | Ito | 384/45 |
| 7,296,332 B2 | * | 11/2007 | Brinker et al. | 29/434 |
| 7,441,560 B2 | * | 10/2008 | Sonoda et al. | 137/375 |
| 2006/0185729 A1 | * | 8/2006 | Ingram | 137/68.14 |

FOREIGN PATENT DOCUMENTS

| | | |
|---|---|---|
| JP | 63147916 | 9/1988 |
| JP | 573375 | 10/1993 |
| JP | 637039 | 5/1994 |
| JP | 2004068897 | 3/2004 |
| JP | 2006153223 | 6/2006 |

* cited by examiner

*Primary Examiner* — Peter DungBa Vo
*Assistant Examiner* — Azm Parvez
(74) *Attorney, Agent, or Firm* — Ladas & Parry, LLP (57) ABSTRACT

The present invention includes a mounting structure for mounting a component between a first member and a second member. According to the mounting structure, the component is first placed on a surface of the first member. Then, the second member is fitted with the component by a fitting device, so that the component is positioned relative to the second member. Thereafter, the component is fixed in position relative to the first member by a joint device.

6 Claims, 5 Drawing Sheets

COMPONENT MOUNTING STRUCTURES

This application claims priority to Japanese patent application serial number 2007-239074, the contents of which are incorporated herein by reference.

BACKGROUND OF THE INVENTION

1. Field of the Invention

The present invention relates to mounting structures for mounting a component(s) between two members that are opposed to each other.

2. Description of the Related Art

Figure 8:
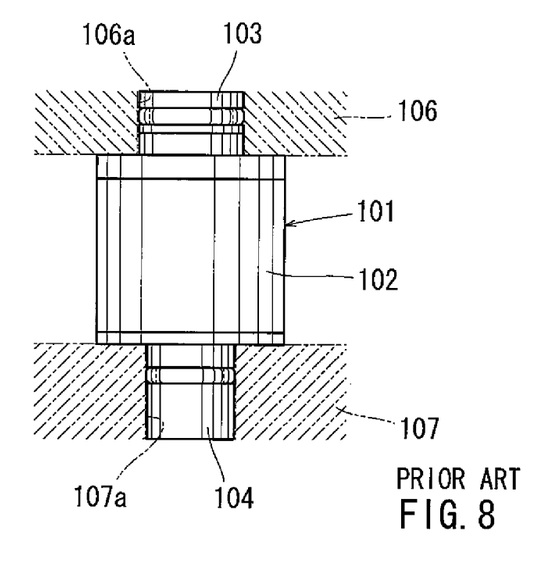
FIG. 8 is a vertical sectional view of a known component mounting structure.

A known mounting structure is shown in a vertical sectional view in FIG. 8. Referring to FIG. 8, a rod-like component 101 includes a cylindrical body 102 and upper and lower mount shafts 103 and 104. The upper and lower mount shafts 104 and 104 extend upward and downward from central portions of upper and lower end surfaces of the cylindrical body 102, respectively. An upper member 106 has a fitting hole 106a for fitting with the upper mount shaft 103 of the component 101. A lower member 107 has a fitting hole 107a for fitting with the lower mount shaft 104 of the component 101. The upper mount shaft 103 and the lower mount shaft 104 of the component 101 are fitted into the fitting hole 106a of the upper member 106 and the fitting hole 107a of the lower member 107, respectively. With these fitting operations, the component 101 is mounted between the upper member 106 and the lower member 107 that are opposed to each other in the vertical direction in the state where the component 101 is positioned with respect to a direction (i.e., a horizontal direction) that intersects with a direction (i.e., a vertical direction) along which the two members 106 and 107 are opposed to each other. Such a known mounting structure is disclosed, for example, in Japanese Laid-Open Utility Model Publication No. 6-37039.

With the above known mounting structure shown in FIG. 8, even if the two members 106 and 107 have a predetermine positional relationship with respect to the horizontal direction, axes of the fitting holes 106a and 107a of the two members 106 and 107 do not align with each other in some cases. If this misalignment occurs, although one of the mount shafts 103 and 104 may be fitted into the fitting hole 106a or 107a of the corresponding one of the two members 106 and 107, the other of the mount shafts 103 and 104 may not be fitted into the fitting hole 106a or 107a. This may lead to defective mounting of the component 101.

Therefore, there is a need in the art for mounting structures that can prevent or minimize defective mounting of a component between two opposing members.

SUMMARY OF THE INVENTION

One aspect according to the present invention includes a mounting structure for mounting a component between a first member and a second member. According to the mounting structure, the component is first placed on a surface of the first member. Then, the second member is fitted with the component by a fitting device, so that the component is positioned relative to the second member. Thereafter, the component is fixed in position relative to the first member by a joint device.

DETAILED DESCRIPTION OF THE INVENTION

Each of the additional features and teachings disclosed above and below may be utilized separately or in conjunction with other features and teachings to provide improved component mounting structures and methods of mounting components. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

In one embodiment, a mounting structure for mounting a component between a first member and a second member opposed to each other in a first direction includes a fitting device and a joint device. The fitting device can fit the component with the first member in the first direction. The joint device can join the component to the second member with the mounting position of the component adjusted with respect to a second direction that intersects with the first direction.

Therefore, even in the event that the position of the component fitted with the first member is offset from a proper position, the joint device can join the component to the second member with the mounting position of the component adjusted with respect to the second direction. Therefore, it is possible to prevent or minimize potential defective mounting of the component. This is particular effective for preventing potential defective mounting of the component in the case that the first member and the second member have a predetermined positional relationship with each other with respect to the second direction.

The component may have a first flow channel formed therein. The second member has a second flow channel formed therein for communication with the first flow channel. The first flow channel and the second flow channel may have a first open end and a second end, respectively. The first open end and the second open end are opposed to each other when the first flow channel and the second flow channel have been brought to communicate with each other. The first open end and the second open end are sized such that one of the first and second open ends is completely overlapped with the other when the component has been joined to the second member by the joint device.

With this arrangement, it is possible to prevent or minimize potential defective communication between the first flow channel and the second flow channel because one of the first open end of the first flow channel and the second open end second flow channel can be completely overlapped with the other.

The fitting device may include a fitting hole and a mount shaft configured to be able to be fitted into the fitting hole. The fitting hole is formed in one of the component and the first member, and the mount shaft is formed on the other of the component and the first member.

In another embodiment, a mounting structure for mounting a plurality of components between a first member and a second member opposed to each other in a first direction includes a first fitting device, a second fitting device and a joint device. The first fitting device can fit one of the components with the first member and with the second member in the first direction. The second fitting device can fit the remaining components with the first member in the first direction. The joint device can join the remaining components to the second member with the mounting positions of the remaining components adjusted with respect to a second direction that intersects with the first direction.

With this arrangement, even in the event that the positions of the remaining components fitted with the first member are offset from their proper positions, the joint device can join the remaining components to the second member with the mounting positions of the remaining components adjusted with respect to the second direction. Therefore, it is possible to prevent or minimize potential defective mounting of the remaining components. This is particular effective for preventing potential defective mounting of the remaining components in the case that the first member and the second member have a predetermined positional relationship with each other with respect to the second direction.

<First Embodiment>

Figure 1:
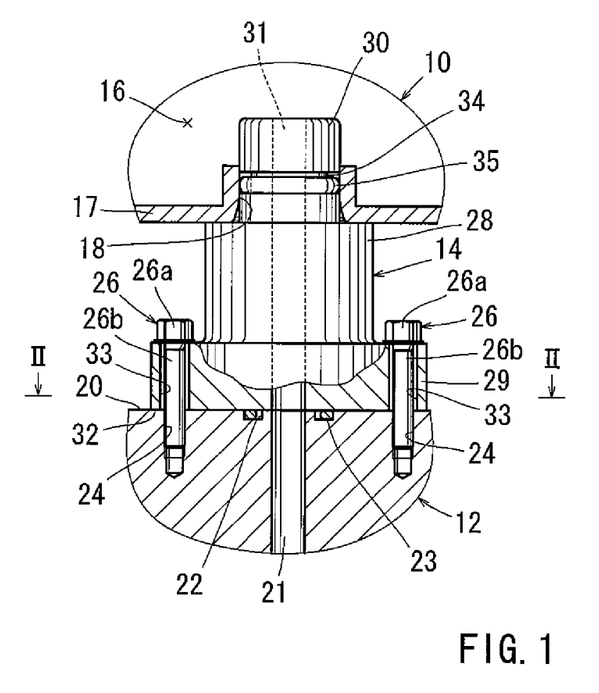
FIG. 1 is a vertical sectional view of a component mounting structure according to a first embodiment of the present invention.
Figure 2:
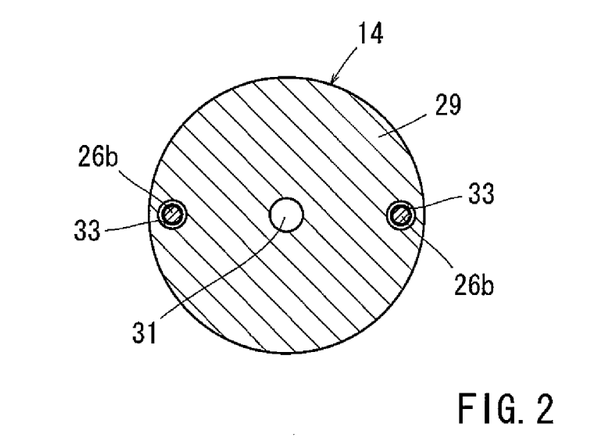
FIG. 2 is a cross sectional view taken along line II-II in FIG. 1.

A mounting structure according to a first embodiment of the present invention will now be described with reference to FIGS. 1 and 2. Referring to FIG. 1, the mounting structure of this embodiment is configured to mount a component 14 between a container 10 and a support member 12. In this embodiment, the container 10 and the support member 12 are positioned on the upper side and the lower side, respectively. The component 14 has a rod-like configuration.

The container 10 defines an internal space 16 therein and has a bottom plate 17 that extends in a horizontal direction. A circular fitting hole 18 is formed in the bottom plate 17 and extends in the vertical direction throughout the thickness of the bottom plate 17.

The upper surface of the support member 12 defines a horizontal support surface 20. A flow channel 21 having a circular cross section is formed in the support member 12 and extends in the vertical direction throughout the thickness of the support member 12. An annular groove 22 is formed in the support surface 20. The annular groove 22 has the same axis as the flow channel 21 and is positioned to surround the flow channel 21. An O-ring 23 is fitted into the annular groove 22. A suitable number of threaded holes 24 are formed in the support surface 20 and are positioned on the radially outer side of the annular groove 22. In this embodiment, two threaded holes 24 are provided. More specifically, the threaded holes 24 are positioned on a circle about the axis of the flow channel 21, i.e., the axis of the annular groove 22, and are spaced equally (i.e., by an angle of 180°) from each other in the circumferential direction. Fastening bolts 26 configured as headed bolts have threaded shanks 26b that are engageable with the threaded holes 24, respectively.

The component 14 has a cylindrical body 28, a mount base 29 and a mount shaft 30. The mount base 29 extends radially outward in a manner like a flange from the lower end of the body 28. The mount shaft 30 is configured as a circular rod and extends vertically upward from a central portion of the upper end surface of the body 28. The mount base 29 and the mount shaft 30 have the same axis as the body 28. A flow channel 31 having a circular cross section is formed in the component 14 and extends vertically in the axial direction throughout the length of the component 14. The diameter of the flow channel 31 is set to be equal to the diameter of the flow channel 21.

The lower end surface of the body 28 including the mount base 29 defines a horizontal mount surface 32. Two bolt insertion holes 33 are formed in the outer circumferential portion of the mount base 29 and extend vertically therethrough. The bolt insertion holes 33 are positioned to correspond to the threaded holes 24 of the support member 12. In addition, the diameter of the bolt insertion holes 33 is set to be larger than the diameter of the threaded shanks 26b, so that the threaded shanks 26b can be loosely inserted into the bolt insertion holes 33, respectively (see FIG. 2).

The mount shaft 30 can be fitted into the fitting hole 18 of the container 10. An annular groove 34 is formed in the outer circumferential surface of the mount shaft 30. An O-ring 35 is fitted into the annular groove 34 while it is elastically deformed.

A representative method of mounting the component 14 will now be described. First, the component 14 is placed on the support surface 20 of the support member 12 such that the axis of the flow channel 31 of the component 14 is positioned to align or substantially align with the axis of the flow channel 21 of the support member 12. In this state, the mount surface 32 of the component 14 contacts the support surface 20 of the support member 12 in surface-to-surface contact relationship. Therefore, it is possible to slide the component 14 in the horizontal direction along the support surface 20 of the support member 12. The influence of the resiliency of the O-ring 23 may be ignored during this step.

Next, the fitting hole 18 of the container 10 is fitted with the mount shaft 30 of the component 14 that has the O-ring 35 fitted thereon. Hence, the axis of the fitting hole 18 of the container 10 is brought to align with the axis of the mount shaft 30 of the component 14, so that the component 14 can be positioned with respect to the diametrical direction (i.e., horizontal direction). Therefore, the mounting position of the component 14 to the support surface 20 is adjusted due to the sliding movement of the component 14 in the horizontal direction along the support surface 20 of the support member 12.

At the same time, the flow channel 31 of the component 14 and the internal space 16 of the container 10 are brought to communicate with each other, and the O-ring 35 seals between the outer circumferential surface of the mount shaft 30 and the inner circumferential surface of the fitting hole 18 of the container 10 due to the resiliency of the O-ring 35 in the diametrical direction. Although the upper end surface of the body 28 and the lower surface of the bottom plate 17 of the container 10 are in contact with each other as shown in FIG. 1, they may be spaced from each other.

Subsequently, the threaded shanks 26b of the two fastening bolts 26 are inserted into the bolt insertion holes 33 of the component 14 and are engaged with the threaded holes 24 of the support member 12, respectively. Tightening the fastening bolts 26 can fasten or integrally join the component 14 (more specifically, the mount base 29) to the support member 12 by the heads 26a of the fastening bolts 26. During this step, the threaded shanks 26b of the fastening bolts 26 are loosely inserted into the bolt insertion holes 33 of the component 14, respectively. Therefore, it is possible to join the component 14 to the support member 12 without causing defective mounting even in the event that the component 14 has been offset in the diametrical direction (horizontal direction) from a proper position relative to the support surface 20 of the support member 12.

Consequently, the component 14 is mounted to the support member 12 to allow communication between the flow channel 31 of the component 14 and the flow channel 21 of the support member 12. In addition, the O-ring 23 is elastically deformed in the axial direction to provide a seal between the mount surface 32 of the component 14 and the support surface 20 of the support member 12.

The mounting operation of the component 14 between the container 10 and the support member 12 is thus completed.

With the mounting structure described above, even in the even that the position of the component 14 fitted with the container 10 is offset in the horizontal direction, which direction intersects with the opposing direction (vertical direction) of the container 10 and the support member 12, from a proper position relative to the support member 12, it is possible to join the component 14 to the support member 12, with the mounting position of the component 14 adjusted in the offset direction. Therefore, it is possible to prevent or minimize potential defective mounting of the component 14 between the container 10 and the support member 12. It is particularly effective to prevent potential defective mounting of the component 14 in the case that the container 10 and the support member 12 have a predetermined positional relationship with each other with respect to the horizontal direction (i.e., the diametrical direction). In addition, in the case that the O-rings 23 and 35 are used as in the above embodiment, it is possible to effectively prevent potential defective sealing of the O-rings 23 and 35.

<Second Embodiment>

A mounting structure according to a second embodiment of the present invention will now be described with reference to FIG. 3. This embodiment is a modification of the first embodiment. Therefore, like members are given the same reference numerals as the first embodiment, and the description of these members will not be repeated.

Figure 3:
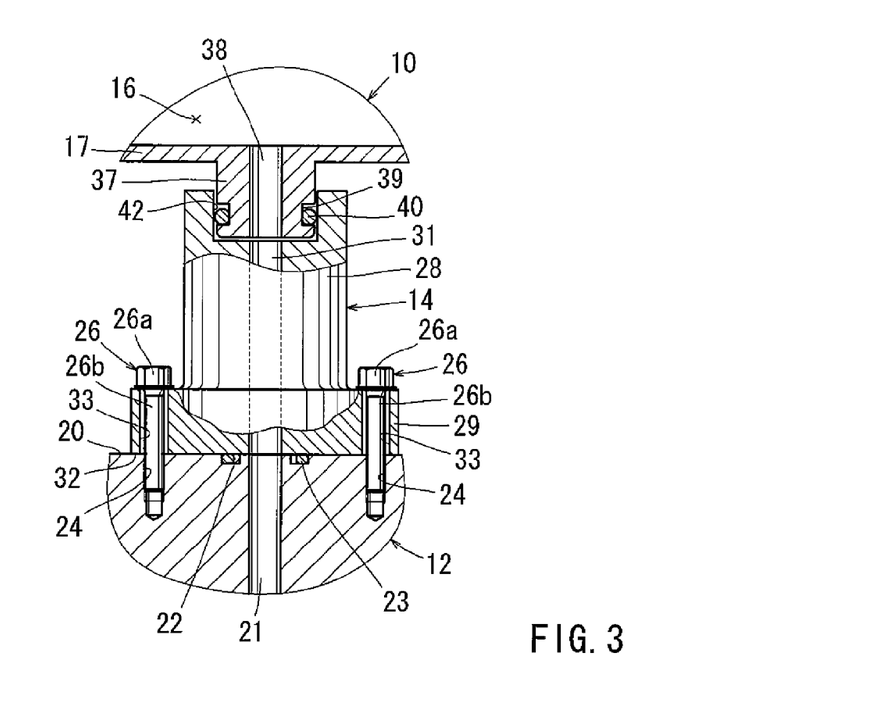
FIG. 3 is a vertical sectional view of a component mounting structure according to a second embodiment of the present invention.

As shown in FIG. 3, in this embodiment, the fitting structure between the fitting hole 18 of the container 10 and the mount shaft 30 of the component 14 of the first embodiment is reversed. Thus, a circular rod-like mount shaft 37 extends downward from the lower surface of the bottom plate 17 of the container 10. A flow channel 38 having a circular cross section extends vertically in the axial direction of the mount shaft 37 throughout the axial length of the mount shaft 37. The diameter of the flow channel 38 is set to be equal to the diameter of the flow channel 31 of the component 14. An annular groove 39 is formed in the outer circumferential surface of the mount shaft 37. An O-ring 40 is fitted into the annular groove 39 while it is elastically deformed.

On the other hand, a bottomed fitting hole 42 having a circular cross section is formed in the upper end surface of the body 28 of the component 14. The fitting hole 42 has the same axis as the flow channel 31 and can be fitted with the mount shaft 37 of the container 10.

With this embodiment, during the process of mounting the component 14, the mount shaft 37 of the container 10 is first fitted into the fitting hole 42 of the component 14, so that the axis of the mount shaft 37 of the container 10 and the axis of the fitting hole 42 of the component 14 are brought to align with each other. Therefore, the component 14 can be positioned with respect to the diametrical direction (horizontal direction). At the same time, the flow channel 31 of the component 14 and the flow channel 38 communicating with the internal space 16 of the container 10 are brought to communicate with each other. In addition, due to the elasticity of the O-ring 40, the O-ring 40 seals between the inner circumferential surface of the fitting hole 42 of the component 14 and the outer circumferential surface of the mount shaft 37.

Therefore, the same advantages as the first embodiment can be obtained also by the second embodiment. The bottomed fitting hole 42 of this embodiment can be applied as the fitting hole 18 of the container 10 of the first embodiment (see FIG. 1).

<Third Embodiment>

A mounting structure according to a third embodiment of the present invention will now be described with reference to FIG. 4. Also, this embodiment is a modification of the first embodiment. Therefore, like members are given the same reference numerals as the first embodiment, and the description of these members will not be repeated.

Figure 4:
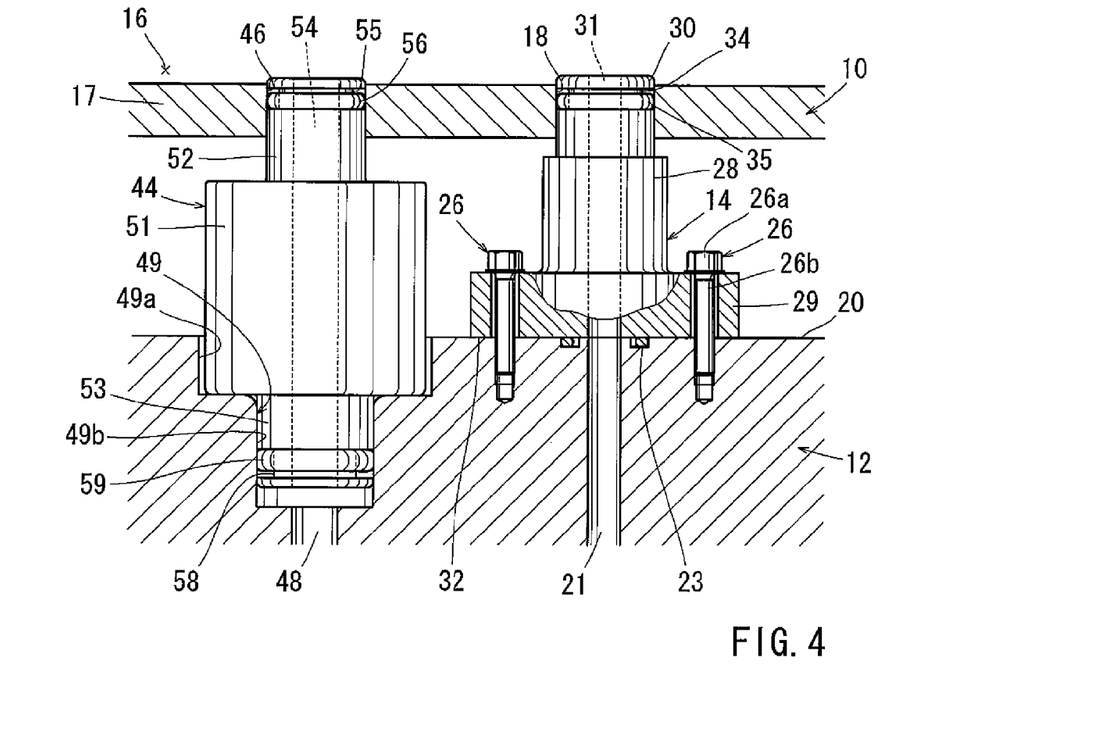
FIG. 4 is a vertical sectional view of a component mounting structure according to a third embodiment of the present invention.

Referring to FIG. 4, in this embodiment, between the container 10 and the support member 12, an additional component 44 is mounted in addition to the component 14. The additional component 44 has a rod-like configuration. For the purpose of explanation, the component 14 will be hereinafter called "first component 14", and the additional component 44 will be hereinafter called "second component 44."

In addition to the fitting hole 18, an additional circular fitting hole 46 is formed in the bottom plate 17 and extends in the vertical direction throughout the thickness of the bottom plate 17. The additional circular fitting hole 46 is positioned in juxtaposed relation with the fitting hole 18. The fitting hole 18 will be hereinafter called "first fitting hole 18", and the additional fitting hole 46 will be hereinafter called "second fitting hole 46."

Also, in addition to the flow channel 21, an additional flow channel 48 having a circular cross section is formed in the support member 12 and extends vertically throughout the thickness of the support member 12. The additional flow channel 48 is positioned in juxtaposed relation with the flow channel 21. The flow channel 21 will be hereinafter called "first flow channel 21", and the additional flow channel 48 will be hereinafter called "second flow channel 48." A bottomed circular fitting hole 49 is formed in the support surface 20 of the support member 12 and has the same axis as the second flow channel 48. The fitting hole 49 has two portions arranged in the vertical direction and having different diameters from each other. More specifically, the fitting hole 49 has a large diameter portion 49a and a small diameter portion 49b disposed on the lower side of the large diameter portion 49a.

The second component 44 has a cylindrical body 51 and circular rod-like mount shafts 52 and 53 extending vertically from central portions of the upper and lower end surfaces of the body 51, respectively. The mount shafts 52 and 53 have the same axis as the body 51. A flow channel 54 having a circular cross section is formed in the second component 44 and extends in the axial direction (i.e., vertical direction) throughout the length of the second component 44. The diameter of the flow channel 54 is set to be equal to the diameter of the second flow channel 48 of the support member 12. The lower end portion of the body 51 can be fitted into the large diameter portion 49a of the fitting hole 49 of the support member 12.

The upper mount shaft 52 can be fitted into the second fitting hole 46 of the container 10. An annular groove 55 is formed in the outer circumferential surface of the upper mount shaft 52. An O-ring 56 is fitted into the annular groove 55 while it is elastically deformed.

The lower mount shaft 53 can be fitted into the small diameter portion 49b of the fitting hole 49 of the support member 12. An annular groove 58 is formed in the outer circumferential surface of the lower mount shaft 53. An O-ring 59 is fitted into the annular groove 58 while it is elastically deformed.

A representative process of mounting the first and second components 14 and 44 will now be described. First, the lower mount shaft 53 of the second component 44 is fitted into the small diameter portion 49b of the fitting hole 49 of the support member 12, and the lower end portion of the body 51 of the second component 44 is subsequently fitted into the large diameter portion 49a of the fitting hole 49. Hence, the axis of the lower mount shaft 53 of the second component 44 is brought to align with the axis of the small diameter portion 49b of the fitting hole 49 of the support member 12. As a result, the second component 44 can be positioned relative to the support member 12 with respect to the diametrical direction (i.e., horizontal direction). At the same time, the flow channel 54 of the second component 44 is brought to communicate with the second flow channel 48 of the support member 12. In addition, due to the elasticity of the O-ring 59, the O-ring 59 seals between the inner circumferential surface of the small diameter portion 49b of the fitting hole 49 of the support member 12 and the outer circumferential surface of the lower mount shaft 53 of the second component 44.

Next, the first component 14 is placed on the support surface 20 in the same manner as described in connection with the first embodiment.

Subsequently, the second fitting hole 46 of the container 10 is fitted with the upper mount shaft 52 of the second component 44. Hence, the axis of the second fitting hole 46 of the container 10 is brought to align with the axis of the upper mount shaft 52 of the second component 44, so that the container 10 can be positioned with respect to the diametrical direction (horizontal direction). At the same time, the internal space 16 within the container 10 is brought to communicate with the flow channel 54 of the second component 44. In addition, due to the elasticity of the O-ring 56, the O-ring 56 seals between the inner circumferential surface of the second fitting hole 46 and the outer circumferential surface of the upper mount shaft 52 of the second component 44.

In this way, the container 10 and the support member 12 can be positioned relative to each other in the horizontal direction by the mounting operations performed relating to the second component 44.

Also, the first fitting hole 18 of the container 10 is fitted with the mount shaft 30 of the first component 14. Hence, the axis of the mount shaft 30 of the first component 14 is brought to align with the axis of the first fitting hole 19 of the container 10, so that the first component 14 can be positioned in the diametrical direction (horizontal direction) relative to the container 10 and eventually to the support member 12. In this way, the mounting position of the first component 14 to the support surface 20 of the support member 12 can be adjusted.

Thereafter, in the same manner as the first embodiment, the first component 14 is joined to the support member 12 by means of the fastening bolts 26. Therefore, the first flow channel 31 of the first component 14 and the internal space 16 of the container 10 are brought to communicate with each other. In addition, due to the elasticity of the O-ring 35, the O-ring 35 seals between the outer circumferential surface of the mount shaft 30 of the first component 14 and the inner circumferential surface of the first fitting hole 18 of the container 10.

With the mounting structure described above, the container 10 and the support member 12 are fitted with the second component 44 in the opposing direction of the container 10 and the support member 12 (i.e., the axial direction of the second component 44). In addition, as described in connection with the first embodiment, even in the even that the position of the first component 14 fitted with the container 10 is offset in the horizontal direction, which direction intersects with the opposing direction (vertical direction) of the container 10 and the support member 12, from a proper position relative to the support member 12, it is possible to join the first component 14 to the support member 12, with the mounting position of the first component 14 adjusted in the offset direction. Therefore, it is possible to prevent or minimize potential defective mounting of the first component 14 between the container 10 and the support member 12. It is particularly effective to prevent potential defective mounting of the first component 14 in the case that the container 10 and the support member 12 have a predetermined positional relationship with each other with respect to the horizontal direction (i.e., the diametrical direction).

The component mounting structure of this embodiment can be suitably applied to a mounting structure for a fuel cell system. Thus, when this embodiment is applied to the fuel cell system, the container 10 may correspond to a surge tank that can absorb the change in pressure of hydrogen gas. The second component 44 may correspond to a flow control valve for controlling the flow rate of the hydrogen gas that is supplied to a fuel cell. The first component 14 may correspond to a pressure release valve that can release the pressure of the hydrogen gas to a downstream-side flow channel, which may correspond to the first flow channel 21, when the pressure of the hydrogen gas within the surge tank has exceeded a predetermined pressure value. The support member 12 may correspond to a base member that supports the flow control valve and the pressure release valve and also serves as a piping member to which downstream-side devices and instruments are connected.

<Fourth Embodiment>

Figure 5:
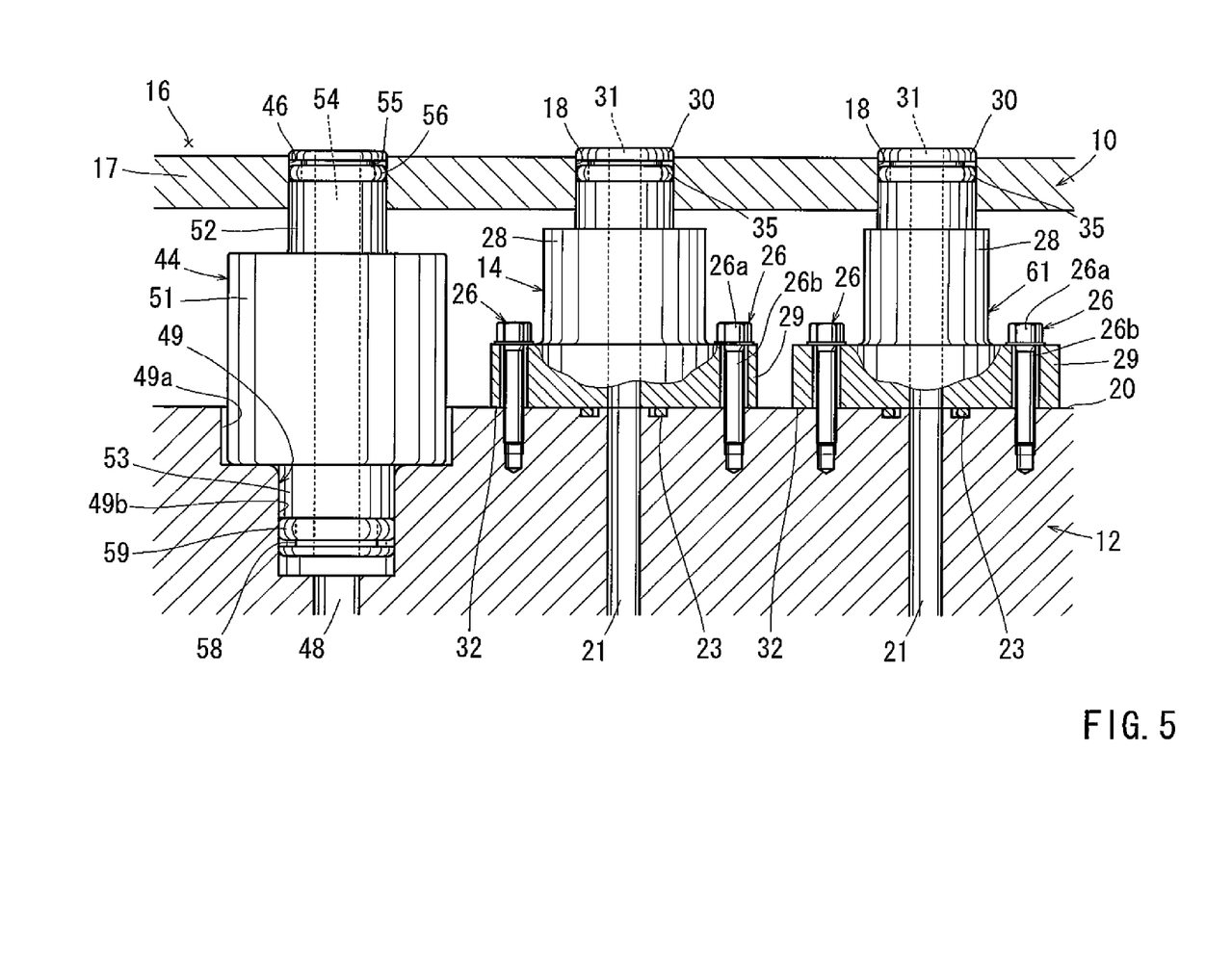
FIG. 5 is a vertical sectional view of a component mounting structure according to a fourth embodiment of the present invention.

A mounting structure according to a fourth embodiment of the present invention will now be described with reference to FIG. 5. This embodiment is a modification of the third embodiment. Therefore, like members are given the same reference numerals as the third embodiment, and the description of these members will not be repeated.

In this embodiment, in addition to the first and second components 14 and 44, a further rod-like component 61 (hereinafter called "third component 61) is mounted between the container 10 and the support member 12. The mounting structure for mounting the third component 61 between the container 10 and the support member 12 is the same as the mounting structure of the first component 14 between the container 10 and the support member 12.

With this embodiment, it is possible to prevent or minimize potential defective mounting of the first component 14 and the third component 61 between the container 10 and the support member 12.

<Fifth Embodiment>

A mounting structure according to a fifth embodiment of the present invention will now be described with reference to FIGS. 6 and 7. This embodiment is a modification of the first embodiment. Therefore, like members are given the same reference numerals as the first embodiment, and the description of these members will not be repeated.

Figure 6:
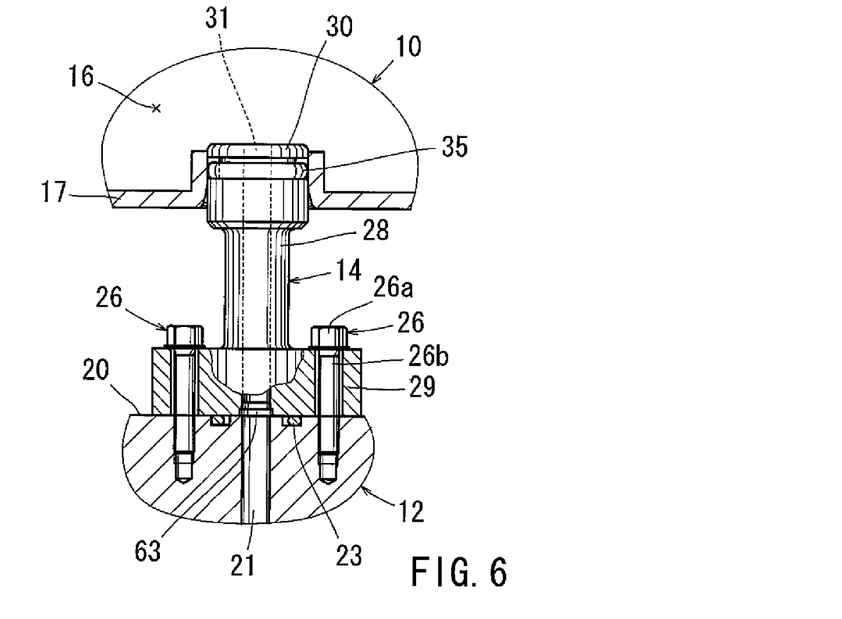
FIG. 6 is a vertical sectional view of a component mounting structure according to a fifth embodiment of the present invention.

This embodiment is configured such that the open end of the flow channel 21 of the support member 12 can be completely overlapped with the open end of the flow channel 31 of the component 14 when the flow channel 31 of the component 14 and the flow channel 21 of the support member 12 have been brought to communicate with each other as shown in FIG. 6.

Figure 7:
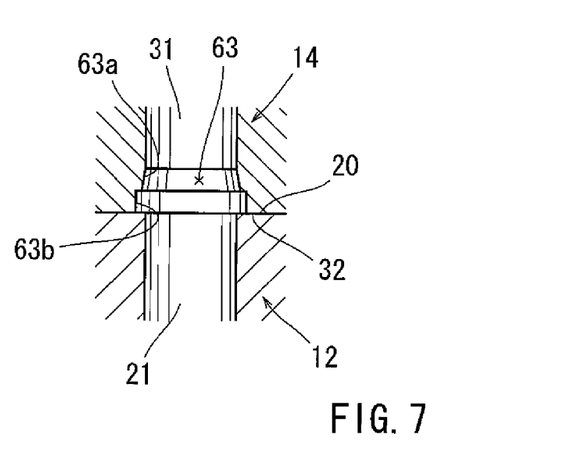
FIG. 7 is an enlarged view of a part of FIG. 6.

More specifically, as shown in FIG. 7, a bottomed circular opening 63 is formed in the mount surface 32 of the component 14 and has the same axis as the flow channel 31. The opening 63 has two portions arranged in the vertical direction and having different diameters from each other. More specifically, the opening 63 has a small diameter portion 63a and a large diameter portion 63b disposed on the lower side of the small diameter portion 63a. Thus, the diameter of the large diameter portion 63b is set to have a diameter larger than the flow channel 21 by taking into account of an adjusting range of the mounting position of the component 14 relative to the support member 12. Here, the adjusting range corresponds to a movable range of the threaded shanks 26b of the fastening bolts 26 and the corresponding bolt insertion holes 33 of the component 14 relative to each other.

With the mounting structure of this embodiment, even in the event that the position of the first component 14 is offset in the horizontal direction (diametrical direction) from a proper position relative to the support member 12, the open end of the flow channel 21 of the support member 12 can still be completely overlapped with the open end of the flow channel 31, i.e., the large diameter portion 63b of the opening 63, of the component 14. Therefore, it is possible to prevent or minimize potential defective communication of the flow channel 31 of the component 14 with the flow channel 21 of the support member 12. Although the opening 63 has two different diameter portions, the opening 63 may have a fixed diameter throughout the axial length or may have three or more different diameter portions arranged in the axial direction.

Further, in the above embodiment, in order to ensure that the open end of the flow channel 21 of the support member 12 is completely overlapped with the open end (i.e., large diameter portion 63b) of the flow channel 31 of the component 14, the opening 63 having the small diameter portion 63a and the large diameter portion 63b and communicating with the flow channel 31 is formed in the mount surface 32 of the component 14. However, it is possible to reverse this arrangement. Thus, an opening (corresponding to the opening 63) having a large diameter portion (corresponding to the large diameter portion 63b) and a small diameter portion (corresponding to the small diameter portion 63a) and communicating with the flow channel 21 may be formed in the support surface 20 of the support member 12. With this arrangement, the open end of the flow channel 31 of the component 14 can be completely overlapped with the open end (large diameter portion) of the flow channel 21 of the support member 12.

The present invention may not be limited to the above embodiments but may be modified in various ways. For example, although the components in the above embodiments have rod-like configurations, the present invention may be applied to a mounting structure for mounting components that have configurations other than the rod-like configuration and have various functions. Therefore, the O-rings or like seal members may be omitted or may be incorporated if necessary. In addition, although the mounting position of the component(s) is adjusted by the sliding movement between the flat surface(s) of the component(s) and the flat surface of one of the two members (between the surface 32 and the surface 20 in the case of the above embodiments), the sliding contact between spherical surfaces can be used for adjustment. Further, any other means than the fastening bolts 26 can be used for joining the component(s) to one of the two members. For example, the component can be joined by crimping, adhesion or welding or by using a clip(s).

This invention claims:

1. A device comprising:
   first and second members opposed to each other in a first direction;
   a component having an axial direction, wherein the first direction is the axial direction;
   a fitting device comprising a fitting hole and a mount shaft configured to be able to be fitted into the fitting hole, and constructed to fit the component with the first member in the first direction, so that the component is fixed in position relative to the first member with respect to a second direction that intersects with the first direction; and
   a joint device constructed to join the component to the second member with the mounting position of the component adjusted with respect to the second direction;
   wherein the second direction is substantially perpendicular to the first direction;
   wherein the component includes a flat mount surface and the second member includes a flat support surface, the mount surface and the support surface contacting with each other in the first direction;
   wherein the mount surface and the support surface extend parallel to each other in the second direction, so that the mount surface and the support surface can slide relative to each other along the second direction;
   wherein the joint device comprises a fastener having a shank, an insertion hole formed in the component and extending in the first direction, and a joint hole formed in the second member and configured to be joined to the shank, so that the fastener is not movable relative to the second member in the second direction; and
   wherein the shank of the fastener is loosely inserted into the insertion hole, so that a clearance is formed between the shank and an inner wall of the insertion hole in the second direction.

2. The device as in claim 1, wherein:
   the component has a first flow channel formed therein;
   the second member has a second flow channel formed therein for communication with the first flow channel;
   the first flow channel and the second flow channel have first open end and a second end, respectively, the first open end and the second open end being opposed to each other when the first flow channel and the second flow channel have been brought to communicate with each other; and
   the first open end and the second open end are sized such that one of the first and second open ends is completely overlapped with the other when the component has been joined to the second member by the joint device.

3. The device as in claim 1, wherein:
   the fitting hole is formed in one of the component and the first member; and
   the mount shaft is formed on the other of the component and the first member.

4. The device as in claim 1, wherein the joint device is configured such that the joint device can join the component to the second member with a predetermined tolerance in the second direction.

5. The device as in claim 1,
wherein the fitting device is constructed so that the component is positioned at an adjusted position relative to the second member with respect to a second direction intersecting with the first direction; and
wherein the joint device is constructed to join the component to the second member at the adjusted position.

6. The device as in claim 1,
wherein the fastener comprises a plurality of fasteners, the insertion hale comprises a plurality of corresponding insertion holes, and the joint hole comprises a plurality of corresponding joint holes.

* * * * *